(12) United States Patent
Bachofer

(10) Patent No.: US 9,803,759 B2
(45) Date of Patent: Oct. 31, 2017

(54) DISC VALVE

(71) Applicant: MACK & SCHNEIDER GmbH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 0 days.

(21) Appl. No.: 14/706,133

(22) Filed: May 7, 2015

(65) Prior Publication Data

US 2015/0233483 A1 Aug. 20, 2015

Related U.S. Application Data

(63) Continuation of application No. PCT/EP2013/073224, filed on Nov. 7, 2013.

(30) Foreign Application Priority Data

Nov. 7, 2012 (DE) ........................ 10 2012 022 212

(51) Int. Cl.
*F16K 11/074* (2006.01)
*F16K 3/08* (2006.01)
*F16K 27/04* (2006.01)

(52) U.S. Cl.
CPC ... *F16K 11/0743* (2013.01); *Y10T 137/86533* (2015.04)

(58) Field of Classification Search
CPC .... F16K 11/074; F16K 27/045; F16K 27/047; F16K 3/08; Y10T 137/86533;

(Continued)

(56) References Cited

U.S. PATENT DOCUMENTS 3,473,551 A 10/1969 Murauskas
3,687,163 A * 8/1972 Nickels ................. F16K 11/076
137/625.11

(Continued)

FOREIGN PATENT DOCUMENTS

DE 69716915 4/2003
DE EP 1319877 A2 * 6/2003 ............ F16K 11/074

(Continued)

OTHER PUBLICATIONS

International Search Report of corresponding International Application No. PCT/EP2013/073224, mailed on Feb. 20, 2014.

(Continued)

*Primary Examiner* — Seth W Mackay-Smith
(74) *Attorney, Agent, or Firm* — Edell, Shapiro & Finnan LLC

(57) ABSTRACT

A disc valve, in particular a multi-way control valve, is provided which has a housing that has an inlet connection and an outlet connection as connections for a liquid and/or gaseous medium. The connections end in respectively different chambers of the housing, at least one valve disc, in particular a ceramic valve disc, which is provided with at least one first through-flow opening and is arranged rotatably mounted in the housing in order to fluidically connect and separate from each other the different chambers depending on its rotational position by means of the through-flow opening, and a control shaft, which is connected torque-proof to the valve disc in the housing. The disc valve is characterized in that the control shaft or the valve disc has a radial projection, and the housing has at least one rotation stop, which is located in the movement path of the radial projection.

13 Claims, 5 Drawing Sheets

(58) Field of Classification Search
CPC ..... Y10T 137/86823; Y10T 137/86831; Y10T 137/86863; Y10T 137/87676; Y10T 137/87692; Y10T 137/877; Y10T 137/87708; Y10T 137/87909
See application file for complete search history.

(56) References Cited

U.S. PATENT DOCUMENTS

| | | | | |
|---|---|---|---|---|
| 4,243,063 | A * | 1/1981 | Parkison | F16K 11/0746 137/100 |
| 4,423,752 | A * | 1/1984 | Psarouthakis | F16K 11/022 137/270 |
| 4,819,907 | A | 4/1989 | Gostelow | |
| 5,014,748 | A * | 5/1991 | Nogami | F16K 3/085 137/625.21 |
| 5,022,429 | A * | 6/1991 | Rollini | E03C 1/104 137/218 |
| 5,044,605 | A | 9/1991 | Körfgen et al. | |
| 5,398,717 | A * | 3/1995 | Goncze | F16K 3/08 137/270 |
| 5,826,615 | A * | 10/1998 | Ko | F16K 11/0746 137/454.6 |
| 5,950,576 | A | 9/1999 | Busato et al. | |
| 6,892,761 | B2 * | 5/2005 | Chen | F16K 11/0743 137/625.4 |
| 8,074,678 | B2 * | 12/2011 | Kee | F16K 3/08 137/493.8 |
| 8,857,469 | B2 * | 10/2014 | Wang | F16K 11/074 137/625.15 |
| 2006/0032540 | A1 | 2/2006 | Yang | |

FOREIGN PATENT DOCUMENTS

| | | | |
|---|---|---|---|
| EP | 0246359 | 11/1987 | |
| EP | 1150050 | 10/2001 | |
| EP | 2357387 | 8/2011 | |
| FR | 784567 A * | 7/1935 | ................ C02F 1/42 |
| FR | 969287 A * | 12/1950 | ................ C02F 1/42 |
| FR | 2217610 | 9/1974 | |
| GB | 1504281 A * | 3/1978 | ............ F16K 11/072 |
| WO | 0106156 | 1/2001 | |

OTHER PUBLICATIONS

English language International Preliminary Report on Patentability for International Application No. PCT/EP2013/073224.

* cited by examiner

DISC VALVE

CROSS REFERENCE TO RELATED APPLICATIONS

This application is a continuation of International Application No. PCT/EP2013/073224, filed on Nov. 7, 2013, which claims priority under 35 U.S.C. §119 to Application No. DE 102012022212.2 filed on Nov. 7, 2012, the entire contents of which are hereby incorporated by reference.

FIELD OF THE INVENTION

The invention relates to a disc valve, in particular to a multi-way control valve, having a housing that has at least one inlet connection and at least one outlet connection as connections for a liquid and/or gaseous medium. The connections end in respectively different chambers of the housing, having at least one valve disc, in particular a ceramic valve disc, which is provided with at least one first through-flow opening and is arranged rotatably mounted in the housing in order to fluidically connect and separate from each other the different chambers depending on its rotational position by means of the at least one through-flow opening, and having a control shaft, which is connected torque-proof to the valve disc in the housing.

BACKGROUND

Disc valves are generally known from the prior art and are used, for example, in motor vehicles to control cooling water circuits or also in beverage vending machines.

From DE 10 2006 049 849 B3, a generic disc valve is known, in which a rotatably mounted ceramic valve disc is arranged between two rigid sealing discs in a housing consisting of two parts that can be rotated by means of a cage in order to adjust a desired through-flow cross section by adjusting a desired rotational position between a through-flow opening of the valve disc and a through-flow opening of the sealing discs in order to guide a fluid medium from an inlet connection to an outlet connection.

Furthermore, a disc valve is known from U.S. Pat. No. 5,950,576, in which the valve disc is connected torque-proof to a control shaft, which serves to operate the disc valve. A desired through-flow cross section is also adjusted in this way by rotating the valve disc in order to control or regulate a desired media flow.

It is a disadvantage of the known disc valves that very close attention must be paid to a correct initial position and connection of the valve disc and the control shaft during assembly in order to subsequently ensure the desired through-flow cross section during operation of the control shaft. The accurate adjustment frequently requires a subsequent test of the rotational position of the control shaft with respect to the actual media flow.

SUMMARY

It is the object of the invention to create a disc valve that easily and economically prevents a subsequent testing procedure for the adjustment of the disc valve.

The disc valve has the advantage that the valve disc can be brought into a mechanically defined initial position during assembly or on first actuation, in which the through-flow cross section is known, and starting from which a rotation at a specific angle of rotation results in an adjustment of the media flow as expected. The disc valve according to an aspect of the invention is characterized in that the valve disc and/or the control shaft have a radial projection, and the housing has at least one rotation stop that is located in the movement path of the radial projection. The radial projection together with the rotation stop of the housing forms an angle of rotation limit for the control shaft or for the valve disc. The position of the angle of rotation limit of the control shaft or of the valve disc is known if the control shaft is respectively rotated so far after assembly until the radial projection abuts against the rotation stop. The position of the angle of rotation between valve disc and control shaft can be easily defined during the preassembly of the control shaft and the valve disc, if the radial projection is not provided on the valve disc but on the control shaft. Since the valve disc and the control shaft are connected torque-proof, their relative position with respect to each other does not change, so that the position of the valve disc with reference to the control shaft and the rotational stop is known during the subsequent assembly of this preassembled structural component in the housing of the disc valve. The provision of a specific position of the angle of rotation between the control shaft and the valve disc during the assembly is unnecessary, if the radial projection is provided directly on the valve disc. A subsequent testing procedure, in which the position of the angle of rotation of the control shaft is compared to the actually adjusted volume flow, is in any case not necessary. The production and maintenance of the valve disc are optimized thereby with regard to time and costs.

According to an example embodiment, the housing has an at least basically cup-shaped distributor housing, as well as a cover that closes off the distributor housing. Such a partition of the housing facilitates the sealing of the housing as a whole, since no complicated sealing points must be provided between the housing parts in the area of the valve disc. The control shaft together with the valve disc that is mounted torque-proof thereon can be easily axially inserted into the distributor housing as a result of the cup shape of the distributor housing, so that the desired sealing function by means of the valve disc is located within the distributor housing. The different chambers are at the same time preferably formed at least in part by axially aligned partition walls in the cup-shaped distributor housing, which are especially configured in one piece with the valve housing. The cup-shaped housing can easily be produced, for example by means of injection molding as a result of the axially running partition walls without having to provide special arrangements for undercuts.

The cover is preferentially provided with a bearing opening, through which the control shaft is guided outwardly with a coupling end, and in which the control shaft can be rotatably mounted. The coupling end of the control shaft that protrudes from the housing is provided, for example, with a profile, in particular a tooth profile or polygon profile, by means of which the control shaft can be driven or displaced by the drive unit, in particular an electromotive drive unit of a control device of the disc valve. The bearing opening is preferably configured in such a way that it forms a friction bearing together with the control shaft. A seal that seals the housing to the outside so that no medium can escape through the bearing opening is also particularly preferably provided in the area of the bearing opening. The control shaft is thus preferentially sealingly guided through the bearing opening. It is, of course also, conceivable to allocate a roller bearing to the bearing opening in order to mount the control shaft.

According to another example embodiment, the at least one rotation stop is arranged on the cover, in particular in one piece with the cover. The stop can be configured at the same time as a bar on the lower side of the cover that faces the valve housing. The cover and distributor housing are preferentially configured in such a way that they can only be connected to each other in one specific position, so that the position of the stop on the cover side in the housing is unequivocal. The preferred configuration of the stop in one piece with the housing, in particular with the cover, further simplifies the assembly.

It is furthermore preferably provided that the control shaft has at least one radially projecting supporting projection, which forms a first axial stop for a spring element, which is held in a preloaded manner between the supporting projection and the valve disc. The control shaft thus still assumes another function, namely a supporting function for a spring element that preloads the valve disc. The spring element is preferentially configured as a helical spring, which can economically provide the preloading force. A tight seat of the valve disc in the housing can be especially ensured by means of the preloading force, so that no medium can flow past the sealing disc, if the valve disc is in a closing position, in which no through-flow cross section is freed by the through-flow opening. The supporting projection can be configured at the same time as a radial bar that extends over the entire periphery. It is preferably provided that several supporting projections are arranged distributed over the periphery of the control shaft. The supporting projections are especially arranged uniformly distributed over the periphery and together form the first axial stop for the spring element, in particular for the helical spring. By providing several individual supporting projections, the weight of the control shaft is reduced and the capacity of the housing is increased.

According to an example embodiment, the control shaft is connected to the valve disc by means of an anti-twist protection. The anti-twist protection always secures the relative position of the angle of rotation between the valve disc and the control shaft during operation.

The anti-twist protection is preferably formed by a positive engagement between the control shaft and the valve disc. The positive engagement is configured in such a way for this purpose that it transmits forces from the control shaft to the valve disc and vice versa in a positive locking manner when viewed in the peripheral direction. A twisting of the valve disc with respect to the control shaft is in this way securely and permanently prevented.

According to another example embodiment, the anti-twist protection has an intermediate element, which is connected torque-proof to the control shaft by a positive engagement and to the valve disc by a further positive engagement. The advantage of the additional intermediate element is that it acts as an adapter between the control shaft and the valve disc, so that the disc valve can be easily produced from a modular system, wherein the desired valve disc can be connected to the control shaft by selecting a corresponding intermediate element. The valve discs of the modular system can differ at the same time, for example, in the type and number of their through-flow openings and also with reference to their maximum outer diameter.

It can be particularly preferably be provided that the intermediate element has at least one clamping rib, which is elastically deformable at least in some sections in order to allow a preassembly of the control shaft, the spring element, the intermediate element and, if required, the valve disc. Owing to its elastic deformability, the clamping rib ensures a frictional connection that secures the intermediate element on the control shaft or on the valve disc, in particular on the control shaft and valve disc. The spring element or the helical spring is first pushed onto the control shaft up to the axial stop, subsequently the intermediate element, and finally the valve disc. The intermediate element for the sealing disc, the spring element and/or the control shaft preferentially has respectively at least one, preferentially respectively several clamping ribs. A compact and easy to handle pre-assembled component is provided as a result of the anti-twist protection and the at least one clamping rib. The frictional connection suitably produced by the at least one clamping rib is configured in such a way that the frictional force is overcome by the spring force of the spring element, so that the frictional connection is overcome during assembly when the preassembled component is introduced into the distributor housing and the cover is pushed onto the control shaft and the distributor housing, so that the preloading force of the spring element can act on the sealing disc. The control shaft is suitably provided for this purpose with a second axial stop, which cooperates with the cover, so that the control shaft axially abuts against the cover. The second axial stop is particularly preferably formed by the previously mentioned at least one supporting projection on the side that faces away from the first axial stop.

It is furthermore preferably provided that the control shaft protrudes through the valve disc and is rotatably mounted in a sealing disc, in particular a ceramic sealing disc, that rests flat on the valve disc, has at least one second through-flow opening, and is mounted torque-proof in the housing with an end that is opposite the coupling end. While the bearing opening preferentially forms the first mounting, the sealing disc preferably forms the second mounting for the control shaft. The valve disc rests flat on the sealing disc and is rotated relative thereto by means of the control shaft in order to adjust a through-flow cross section by means of the first and the second through-flow opening. Owing to the torque-proof configuration of the sealing disc in the housing, the sealing disc is likewise suitable for the mounting of the control shaft and is suitably provided for this purpose with a corresponding seat or bearing bore/bearing opening for receiving the end of the control shaft.

The valve disc and the sealing disc are preferably located between at least one of the first chambers and at least one of the second chambers in order to separate or fluidically connect these chambers from or to each other according to the rotational position. One of the connections of the distributor housing is at the same time preferably provided on one side of the valve disc and the sealing disc—seen in the longitudinal or axial extension of the distributor housing—and another connection is provided on the other side. The different chambers are also accordingly arranged in the housing.

According to another example embodiment, the sealing disc is arranged between the valve disc and an intermediate floor of the distributor housing. The distributor housing thus has an intermediate floor on which the sealing disc rests in some sections. In this respect, the intermediate floor serves as an axial support for the sealing disc, against which the valve disc is pushed from the other side by means of the spring element. The intermediate floor is suitably formed by the free faces of the at least one partition wall that separates the chambers. The at least one partition wall is suitably configured in one piece with the distributor housing, so that it easily forms a secure support for the sealing disc.

The contour of the sealing disc particularly preferably at least basically matches the contour of the intermediate floor. As a result of this, the sealing disc is more or less flush with the intermediate floor, so that its at least one through-flow opening preferably corresponds to the contour of one of the chambers. In this way, it is ensured, among other things, that the seal between the different chambers is ensured by the sealing disc when the valve disc is in a closing position, in which the through-flow opening of the valve disc and sealing disc do not overlap.

According to a further example embodiment, a sealing element, in particular a profile seal with a contour that corresponds to the contour of the sealing disc and/or of the intermediate floor made in particular of an elastically deformable material, is provided between the sealing disc and the floor. The elastically deformable profile seal increases the sealing effect, especially if the sealing disc is a ceramic sealing disc. In any case, the sealing effect is, however, improved because a continuous abutting contact is ensured between the sealing disc and the profile seal, or between the profile seal and the intermediate floor as a result of the elastic deformability of the profile seal.

It is furthermore preferably provided that the ant-twist protection is configured to be asymmetric in order to prevent an incorrect assembly. The anti-twist protection allows the connection of the intermediate element and the valve disc and/or of the control shaft and the intermediate element only in a predetermined rotational position with respect to each other. An incorrect assembly can be easily prevented by means of this so-called poka-yoke design, which is formed by means of an asymmetric cross section of the control shaft, intermediate element and of the corresponding counter contour of the sealing disc for the intermediate element.

BRIEF DESCRIPTION OF THE DRAWINGS

Example embodiments will now be described with reference to the drawings.

DETAILED DESCRIPTION

Figure 1:
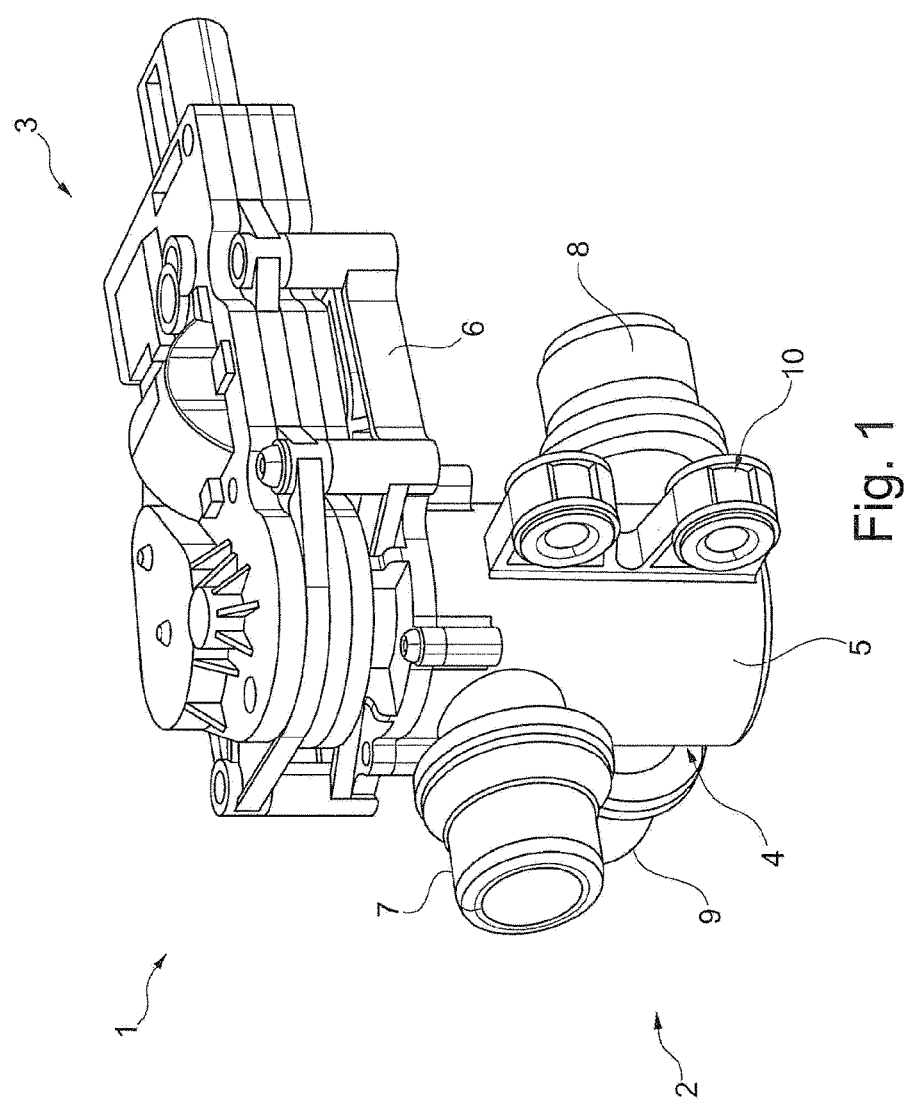
FIG. 1 is a perspective view of a disc valve according to an example embodiment.

FIG. 1 is a perspective view of a valve arrangement having a disc valve 2 as well as an actuator 3 according to an example embodiment.

The disc valve 2 has a housing 4, which is formed by a distributor housing 5 and a cover 6. The distributor housing 5 has three connections, of which one is configured as an inlet connection 7 and the two others are configured as outlet connections 8 or 9. The distributor housing 5 additionally has a holding device 10 for securing the valve arrangement 1, for example, on a body of a motor vehicle.

The actuator 3, which is especially configured as an electromotive actuator 3 provided for this purpose with an electric motor, which is not depicted in detail, as well as a gear mechanism, which can be coupled to a control shaft of the disc valve 2, is assembled on the cover in order to distribute a medium provided at the inlet connection 7 to the outlet connections 8, 9 as desired.

Figure 2:
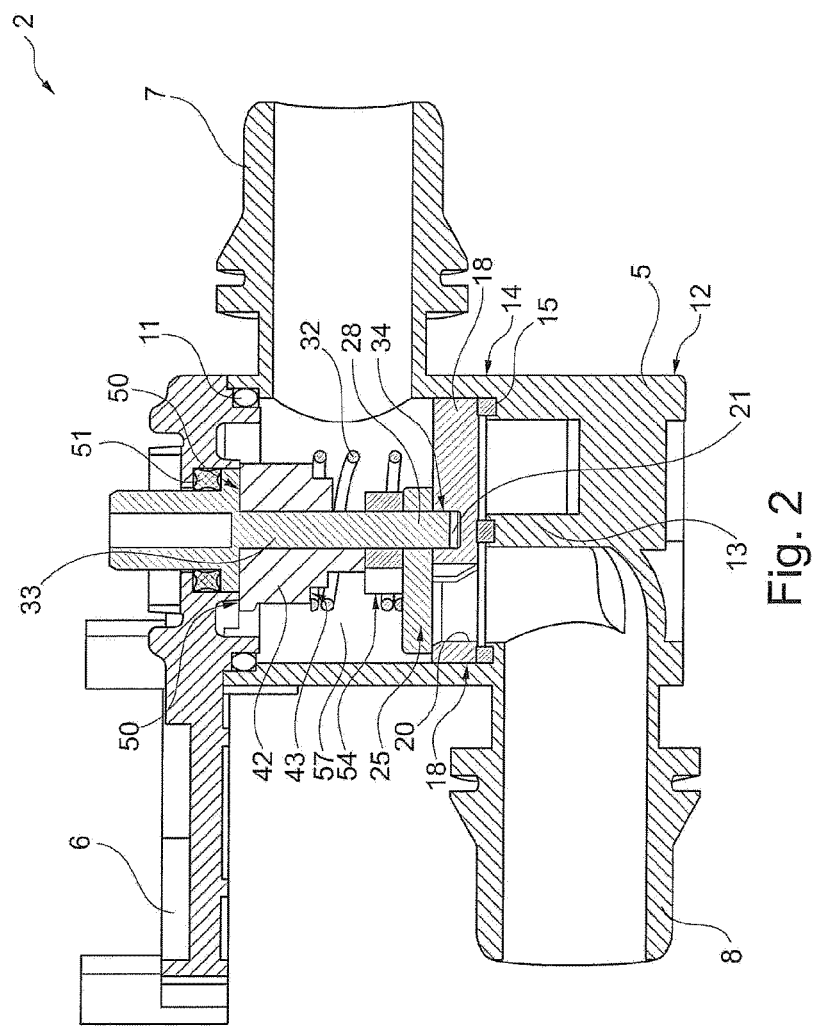
FIG. 2 is a longitudinal view of the disc valve according to an example embodiment.

For this purpose, FIG. 2 shows a longitudinal section of the disc valve 2. The distributor housing 5 is basically configured in the shape of a cup, so that it has a U-shaped basic shape seen in the longitudinal section. The connections 7, 8, 9 are configured in one piece with the distributor housing 5 in the present specification. The cover 6 closes off the open end of the distributor housing 5. In addition, a sealing element 11, which is configured as an O-ring, is provided between the cover 6 and the distributor housing 5. The inlet connection 7 ends—when viewed axially—in the distributor housing 5 above the outlet connection 8, that is, close to the cover 6. A partition wall 13, which extends parallel or axially along the distributor housing 5, and forms an intermediate floor 14 with its free face above the connection 8, starts at the floor 12 of the distributor housing 5 that is located opposite the cover 6.

Figure 3:
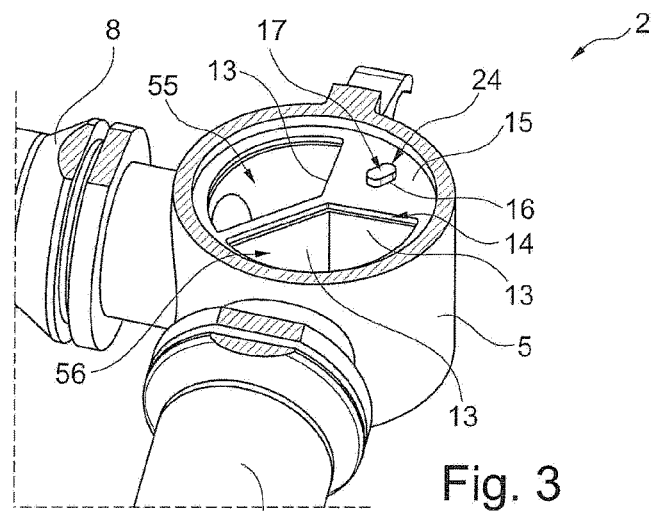
FIG. 3 is a cross sectional view of the disc valve according to an example embodiment.

In this regard, FIG. 3 shows a plan view of the intermediate floor 14 or of the distributor housing 5 above the outlet connections 8 and 9 in a cross sectional view of the disc valve 2. The partition wall 13 forms two chambers 55, 56, in which outlet connections 8, 9 respectively end. The chambers 55, 56 make up at the same time about two thirds of the distributor housing 5, while a remaining third is formed by the intermediate floor 14. The intermediate floor 14 extends in part in the shape of a bar along the inner side of the housing wall over the entire periphery of the distributor housing 5 in order to form a continuous support surface. It is supplemented by the free-standing face of the partition wall 13. The chambers 55 and 56 thus basically extend over approximately 120° of the circular distributor housing 5 each, while a large part of the intermediate floor 14 is formed by the remaining 120° by means of the partition wall 13.

A profile seal 15, whose contour basically matches the contour of the intermediate floor 14, and is configured to be elastically deformable, rests on the intermediate floor 14. The profile seal 15 has a perforation 16, through which an axial projection 17 of the intermediate floor 14 protrudes in order to form an anti-twist protection 24 for the profile seal 15. In this case, the height of the axial projection 17 is selected in such a way that it protrudes from the profile seal 15.

Figures 4A, 4B:
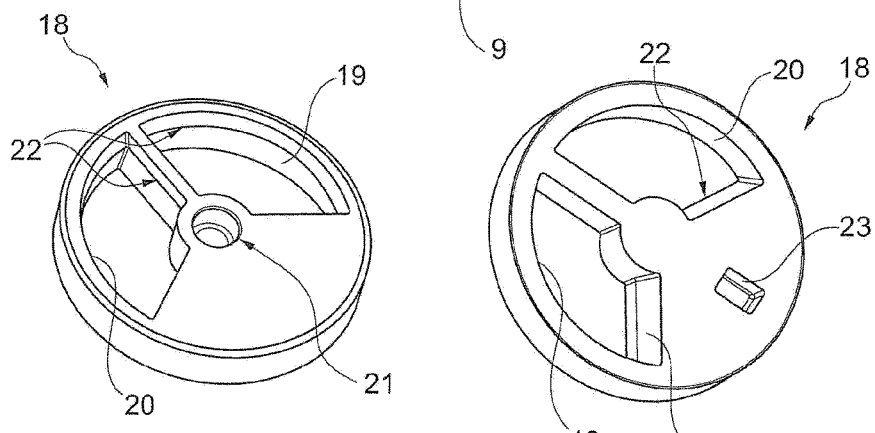
FIGS. 4A and 4B are different perspective views of a sealing disc of the disc valve according to an example embodiment.

FIGS. 4A and 4B are two perspective views of a ceramic sealing disc 18. According to FIG. 2, the sealing disc 18 rests on the profile seal 15. The contour of the sealing disc 18 at least basically matches the contour of the profile seal 15 or of the intermediate floor 14.

FIG. 4A is a plan view of the sealing disc 18 from the direction of the cover 6 according to FIG. 2. The sealing disc 18 has two through-flow openings 19, 20, each of which likewise represents a segment of a circle that extends over approximately 120° corresponding to the chambers 55, 56. The sealing disc 18 also has a bearing seat 21, which is configured as a cylindrical recess (e.g., a blind hole) in the center in the sealing disc 18 on the face that faces toward the cover 6. In addition, the through-flow openings 19, 20 are respectively provided on the same face with a chamfer 22, which serves to improve the flow conditions.

Such chamfers 22 are advantageously also provided on the rear side of the sealing disc 18 in the area of the through-flow openings 19, 20, as shown in FIG. 4B. The sealing disc 18 also has a receiving recess 23, whose contour basically matches the contour of the axial projection 17 and at least in some sections serves as a seat for the axial projection 17, on its face that faces away from the cover 6 in order to form an anti-twist protection for the sealing disc 18 on the intermediate floor 14. A secure arrangement of the sealing disc 18 and of the profile seal 15 in the distributor housing 5 is easily and economically ensured by means of the latter and by the positive anti-twist protection 24.

Figure 5:
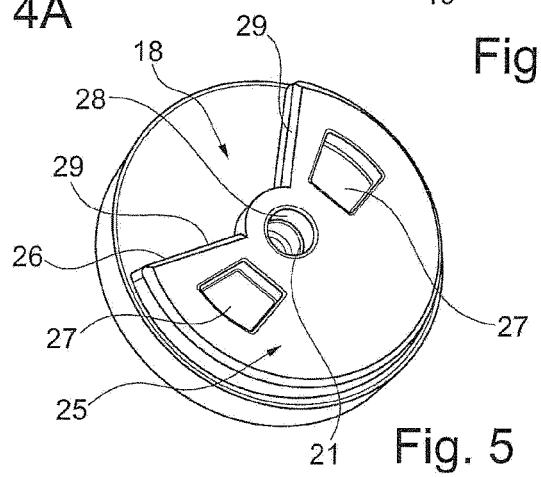
FIG. 5 is a perspective view of a valve disc that interacts with the sealing disc according to an example embodiment.

FIG. 5 shows a further plan view of the sealing disc 18, and namely on the face that faces toward the cover. A valve disc 25, which is likewise made of ceramic and whose outer diameter basically matches the outer diameter of the sealing disc 18 is also arranged at the same time on the sealing disc 18. In the present exemplary embodiment the outer diameter of the valve disc 25 is configured slightly smaller in order to prevent a frictional contact with the surface of the inner side of the distributor housing 5, as is also shown in FIG. 2. The valve disc 25 is configured like a segment of a circle and extends over a segment of a circle of about 240°. The remaining 120° of the valve disc 25 are free and configured with an open edge in order to form a through-flow opening 26, which adjusts a through-flow cross section in a position overlapping with at least one of the through-flow openings 19, 20 of the sealing disc 18. A desired through-flow cross section can thus be adjusted between the inlet connection 7 and at least one of the outlet connections 8, 9, depending on the rotational position of the valve disc 25. The valve disc 25 rests flat on the sealing disc 18 and has two trough-shaped recesses 27, which are arranged at both sides of the center of the valve disc 25 and are configured mirror symmetrically, but not point symmetrically, on its face that faces away from the valve disc 18, so that an incorrect assembly of the disc valve 2 is prevented, as will be explained below in more detail. The valve disc 25 furthermore has a circular breakthrough 28 in the center, which forms an extension of the bearing seat 21 and in this respect likewise has a circular contour. The valve disc 25 is also provided with chamfers 29 on the through-flow opening 26 for an improved throughflow behavior.

Figure 6:
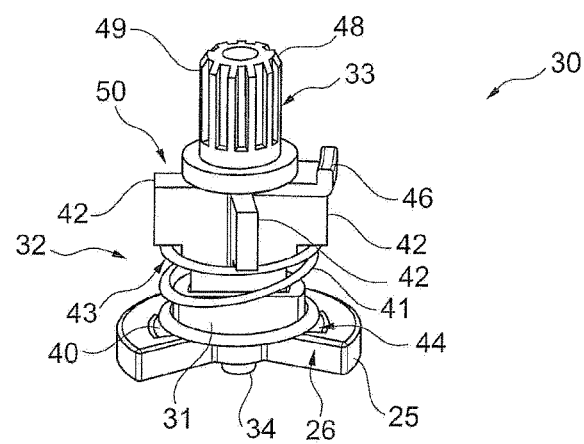
FIG. 6 is a perspective view of a preassembled component of the disc valve according to an example embodiment.

FIG. 6 is a perspective view of a preassembled component 30, which consists of the valve disc 25, an intermediate element 31, a spring element 32 and a control shaft 33.

The control shaft 33 extends with a free end 34 through the perforation 28 of the valve disc 25 in order to engage into the bearing seat 21, as shown in FIG. 2. The free end 34 of the control shaft 33 likewise has a cylindrical shape for this purpose, wherein the outer diameter of the free end 34 and the inner diameter of the bearing seat 21 are selected in such a way that together they form a radial friction bearing for the control shaft 33.

Figure 7A:
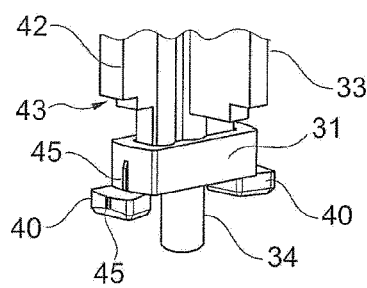
FIGS. 7A and 7B are different views of an anti-twist protection of the disc valve according to an example embodiment.
Figure 7B:
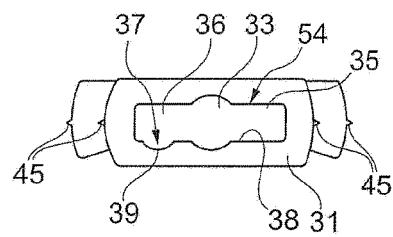

The control shaft 33 has an asymmetrical cross sectional contour at a distance from the free end 34, as shown in more detail in FIGS. 7A and 7B. In this regard, FIG. 7B shows a cross section of the control shaft 33 in the area of the intermediate element 31. The control shaft 33 here has two mutually opposite projections 35, 36 that protrude at a radial distance from the control shaft 33. The projection 36 has an additional projection 37 on one lateral wall, which has a curved contour in the present exemplary embodiment. The intermediate element 31 has an opening 38 that corresponds to the contour of the control shaft 33 in the area of the projections 36, 35. The opening 38 has an additional recess 39 at the side, into which the additional projection 37 can be inserted. The control shaft 33 and the intermediate element 31 can thus be connected to each other in only one single way. An incorrect assembly is securely prevented thereby.

FIG. 7A is a perspective view of the control shaft 33 having the intermediate element 31. The intermediate element 31 has two support legs 40, which are preferentially configured in one piece with the intermediate element 31 and can be brought or engaged into the recesses 27 of the valve disc 25 on its side that faces the valve disc 25. Only one assembly position for the control shaft 33 and the valve disc 25 is possible here because of the asymmetrical design of the recesses 27 and the asymmetrical configuration of the support legs 40. A positively locking anti-twist protection 54 is consequently formed as a whole between the control shaft 33 and the valve disc 25.

The spring element 32 is configured as a helical spring 41 in this example embodiment. The helical spring 41 is axially supported between the laterally projecting support legs 40 of the intermediate element 31 and several radially projecting supporting projections 42 of the control shaft 33. The supporting projections 42 are arranged evenly distributed over the periphery of the control shaft 33 and configured in one piece therewith. Two mutually opposite supporting projections 42 in this case preferentially merge into the lateral projections 35 and 26. The supporting projections 42 together form a first axial stop 43 for the helical spring 41, while the support legs 40 form a second axial stop for the helical spring 41. During the assembly, the helical spring 41 is pushed onto the control shaft 33 up to the first axial stop 43, the intermediate element 31 is subsequently pushed onto the control shaft 33 as described above, and finally the valve disc 25, so that the supports 40 engage in the recesses 27.

Figure 8:
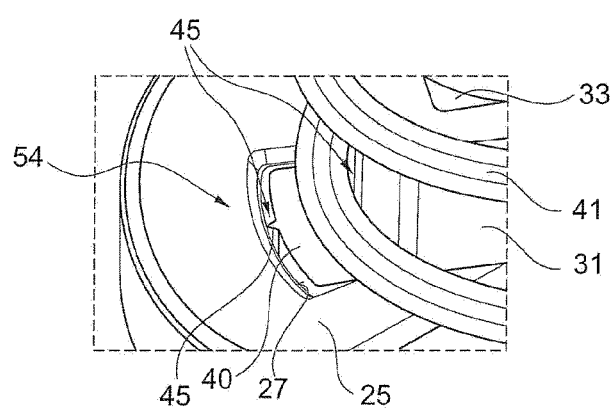
FIG. 8 shows a locking device of the preassembled component according to an example embodiment.

The intermediate element 31 has several elastically deformable clamping ribs 45, which extend in the form of a bar parallel along the disc valve 2 or relative to the axis of rotation of the control shaft 33 in order to lock the preassembled component 30, as shown in FIG. 8. The dimensions of the clamping ribs 45 are selected at the same time in such a way that there is a frictional connection between the intermediate element 31 and the helical spring 41, as well as between the intermediate element 31 and the valve disc 25 as a result of the preloading force provided by the elasticity, which ensures the cohesion of the preassembled component 30.

It is furthermore provided that the control shaft 33 that faces away from the spring element 41 has a radial projection 46 on the side of the support projections 42, as shown in FIG. 6. The radial projection 46 is arranged in a specific predefined relative position with reference to the projections 35 and 36 on the control shaft 33 and is especially configured in one piece therewith, so that there is a unequivocal relative position of the valve disc 25 with respect to the radial projection 46 during the assembly of the disc valve 2 or of the preassembled component 30. This is ensured by means of the respective connections that provide only one assembly option.

Figure 9:
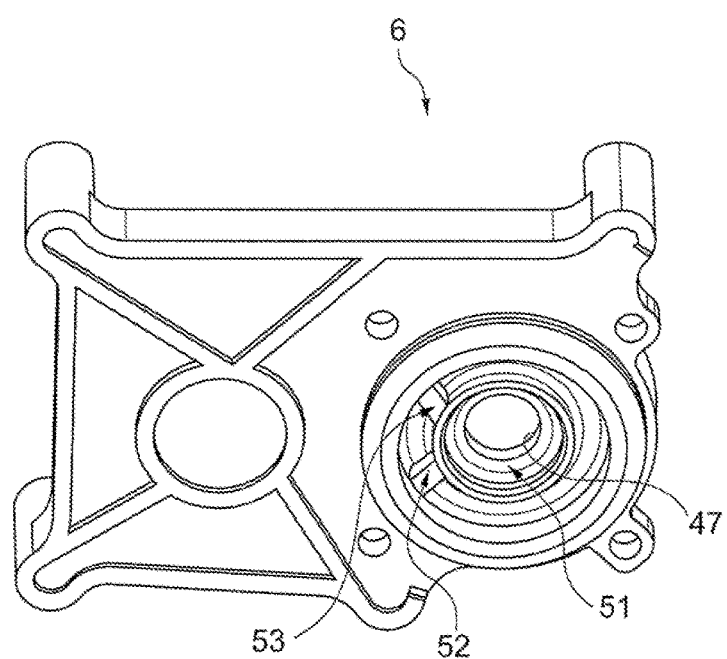
FIG. 9 is a perspective view of a cover of the disc valve according to an example embodiment.

FIG. 9 is a perspective view of the cover 6 from below or as seen from the distributor housing 5. The cover 6 has a bearing opening 47, through which the end of the control shaft 33 opposite the free end 34 can be guided. This end is configured as a coupling end 48 and has an outer gear system 49 on its outer periphery, which can be coupled to or can be brought into operative connection with the actuator 3. As shown in FIG. 2, on their side opposite the axial stop 43, the supporting projections 42 form a second axial stop 50, with which the control shaft 33 is supported on the inner side of the cover 6. A sealing ring 51 is advantageously provided for sealing. The bearing opening 47 as well as the coupling end 48 of the control shaft 33 are configured in such a way that the control shaft 33 is radially mounted in the bearing opening 47 and axially mounted on the cover 6.

As can be seen in FIG. 9, the cover 6 also has two rotation stops 52 and 53, which are respectively formed by an axial projection on the bottom side of the cover and are located in the movement path of the radial projection 46 in the assembled state of the disc valve 2. If the control shaft 33 is actuated by means of the actuator 3, it can then only rotate between the two positions defined by the rotation stops 52 and 53 until the radial projection 46 respectively abuts against one of the rotation stops 52 or 53. The rotation stops 52 and 53 can, of course, also be formed by a correspondingly broad or molded single projection of the cover 6.

The cover 6, as well as the distributor housing 5 is configured in such a way that they can only be connected to each other in a specific relative position, so that the cover 6 is unequivocally aligned on the distributor housing 5. As a result of this, the rotation stops 53 and 52 are at known positions with reference to the chambers 55, 56 or with reference to the through-flow openings 19 and 20. The disc valve 2 can thus be brought into an unequivocal initial position during assembly by means of the actuator as a result of the torque-proof connection of the valve disc 25 to the control shaft 33, as well as of the fixed position of the sealing disc 18 on the housing and the known arrangement of the radial projection, as well as the rotation stops 52, 53, without having to verify this by means of an actually adjusted volume flow through the disc valve 2.

The preassembled component 30 is first put together according to FIG. 6 during assembly. Subsequently, the preassembled component is inserted into the distributor housing 5, in which the profile seal 15 as well as the sealing disc 18 have already been arranged and aligned according to the axial projection 17, so that the free end 34 of the control shaft 33 engages in the bearing seat 21, as shown in FIG. 2. The cover 6 is then pushed with the bearing opening 47 onto the coupling end 48 of the control shaft 33 and the control shaft 33 is preloaded against the helical spring 41 owing to the first axial stop 43, so that the valve disc 25 is pushed against the sealing disc 18 in a spring-loaded manner, so that the valve disc 25 and the sealing disc 18 abut tightly against each other and an undesirable flow through the disc valve 2 is securely prevented. The cover 6 can, for example, be screwed to the distributor housing 5, as shown in FIG. 1, in order to ensure a permanent connection of the housing 4. The rotation stops 52, 53 and the radial projection 46 are securely protected from external influences and are in this respect less prone to contamination because they are arranged inside the housing 4. The valve disc 25 and sealing disc 18 separate or connect the chambers 55 and 56 from or to a chamber 57, which is allocated to the inlet connection 7 and delimited by the distributor housing 5, the cover 6 and the valve disc 25 and the sealing disc 18, depending on the rotational position of the valve disc 25.

In summary, a disc valve 2, in particular a multi-way control valve is provided, having a housing 4 that has at least one inlet connection 7 and at least one outlet connection 8, 9 as connections 7, 8, 9 for a liquid and/or gaseous medium. The connections 7, 8, 9 end in respectively different chambers 55, 56, 57 of the housing 4, having at least one valve disc 25, in particular a ceramic valve disc, which is provided with at least one first through-flow opening 26 and is arranged rotatably mounted in the housing 4 in order to fluidically connect and separate from each other the different chambers 55, 56, 57 depending on its rotational position by means of the at least one through-flow opening 26, and having a control shaft 33, which is connected torque-proof to the valve disc 25 in the housing 4. The control shaft 33 or the valve disc 25 has at least one radial projection 46, and the housing 4 has at least one rotation stop 52, 53, which is located in the movement path of the radial projection 46. The housing 4 has an at least basically cup-shaped distributor housing 5 as well as a cover 6 that closes off the distributor housing 5. The cover 6 has a bearing opening 47, through which the control shaft 33 can be guided outwardly with a coupling end 48, and in which the control shaft 33 is rotatably mounted, characterized in that the control shaft 33 protrudes through the valve disc 25 with an end that is located opposite the coupling end 48 and is rotatably mounted in a sealing disc 18, in particular a ceramic sealing disc, that rests flat on the valve disc 25, has at least one second through-flow opening 20, and is mounted torque-proof in the housing 4.

According to an example embodiment, the at least one rotation stop 52, 53 is arranged on the cover 6, and is especially configured in one piece with the cover 6.

According to another example embodiment, the control shaft 33 has at least one radially projecting supporting projection 42, which forms a first axial stop 43 for a spring element 32, which is held in a preloaded manner between the supporting projection 42 and the valve disc 25.

According to a further example embodiment, the control shaft (33) is connected to the valve disc (25) in particular in a positive-locking manner by means of an anti-twist protection (54).

According to yet another example embodiment, the anti-twist protection 54 has an intermediate element 31, which is connected torque-proof to the control shaft 33 by means of a positive engagement and to the valve disc 25 by means of a further positive engagement.

According to an example embodiment, the intermediate element 31 has a clamping rib 45, which is elastically deformable in at least some sections in order to allow a preassembly of the control shaft 33, the spring element 32, the intermediate element 31 and the valve disc 25.

According to another example embodiment, the valve disc 25 and the sealing disc 18 are located between at least one of the chambers 55, 56 and at least another one of the chambers 57.

According to a further example embodiment, the sealing disc 18 is arranged between the valve disc 25 and the intermediate floor 14 of the distributor housing 5.

According to an example embodiment, the contour of the sealing disc 18 at least basically matches the contour of the intermediate floor 14.

According to another example embodiment, a sealing element, in particular a profile seal 15 is provided having a contour that matches the contour of the sealing disc 18 and/or the intermediate floor 14 and in particular made of an elastically deformable material, is provided between the sealing disc 18 and the intermediate floor 14.

According to a further example embodiment, the anti-twist protection 54 is configured asymmetrically in order to prevent an incorrect assembly.

What is claimed is:
1. A disc valve comprising:
    a housing comprising connections for a liquid or gaseous medium including at least one inlet connection and at least one outlet connection, wherein the connections end in respectively different chambers of the housing, wherein the housing has an at least basically cup-shaped distributor housing and a cover that closes off the distributor housing;

at least one valve disc which is provided with at least one first through-flow opening and which is rotatably mounted in the housing in order to fluidically connect and separate from each other the different chambers depending on its rotational position by means of the at least one through-flow opening;

a control shaft which is connected torque-proof to the at least one valve disc in the housing, wherein the control shaft or the valve disc has at least one radial projection, and wherein the housing has at least one rotation stop, which is located in a movement path of the at least one radial projection, and wherein the cover has a bearing opening through which the control shaft can be guided outwardly with a coupling end, and in which the control shaft is rotatably mounted; and a sealing disc which has at least one second through-flow opening and is mounted torque-proof in the housing, wherein the control shaft protrudes through the at least one valve disc with an end that is located opposite the coupling end and is rotatably mounted in a bearing seat configured as a cylindrical blind hole in the center of the sealing disc that rests flat on the at least one valve disc.

2. The disc valve according to claim 1, wherein the at least one rotation stop is arranged on the cover, and is configured in one piece with the cover.

3. The disc valve according to claim 1, wherein the control shaft has at least one radially projecting supporting projection, which forms a first axial stop for a spring element, which is held in a preloaded manner between the supporting projection and the at least one valve disc.

4. The disc valve according to claim 1, wherein the control shaft is connected to the valve disc in a positive-locking manner by means of an anti-twist protection.

5. The disc valve according to claim 4, wherein the anti-twist protection has an intermediate element which is connected torque-proof to the control shaft by means of a positive engagement and to the at least one valve disc by means of a further positive engagement.

6. The disc valve according to claim 5, wherein the intermediate element has a clamping rib which is elastically deformable in at least some sections in order to allow a preassembly of the control shaft, the spring element, the intermediate element and the at least one valve disc.

7. The disc valve according to claim 4, wherein the anti-twist protection is configured asymmetrically in order to prevent an incorrect assembly.

8. The disc valve according to claim 1, wherein the at least one valve disc and the sealing disc are located between at least one of the different chambers and at least another one of the different chambers.

9. The disc valve according to claim 1, wherein the sealing disc is arranged between the at least one valve disc and an intermediate floor of the distributor housing.

10. The disc valve according to claim 9, wherein a contour of the sealing disc matches with a contour of the intermediate floor.

11. The disc valve according to claim 9, wherein a sealing element having a contour that matches with a contour of the sealing disc or the intermediate floor and in particular made of an elastically deformable material is provided between the sealing disc and the intermediate floor.

12. The disc valve according to claim 11, wherein the sealing element is a profile seal.

13. The disc valve according to claim 1,
wherein the disc valve is a multiway control valve,
wherein the at least one valve disc is a ceramic valve disc, and
wherein the sealing disc is a ceramic sealing disc.

* * * * *